United States Patent [19]
Wardell

[11] Patent Number: 6,007,276
[45] Date of Patent: Dec. 28, 1999

[54] END-MILL TOOL WITH HIGH AND LOW HELICAL FLUTES AND RELATED METHOD FOR ROUGH CUTTING AND FINISHING A WORKPIECE

[76] Inventor: Lon J. Wardell, 740 Tobin Dr., Apt. 102, Inkster, Mich. 48141

[21] Appl. No.: 08/798,324

[22] Filed: Feb. 10, 1997

Related U.S. Application Data

[63] Continuation-in-part of application No. 08/238,864, May 6, 1994, abandoned.

[51] Int. Cl.[6] .................................................... B23B 51/00
[52] U.S. Cl. ................................ 407/54; 407/56; 407/63; 408/230
[58] Field of Search ............................ 407/54, 53, 55, 407/56, 57, 58, 63, 113; 408/226, 227, 228, 229, 230

[56] References Cited

U.S. PATENT DOCUMENTS

| | | | |
|---|---|---|---|
| 4,182,587 | 1/1980 | Striegl | 407/113 |
| 4,475,850 | 10/1984 | Penoza et al. | 407/54 |
| 4,480,949 | 11/1984 | Van De Bogart | 407/54 |
| 4,497,600 | 2/1985 | Kishimoto | 407/53 |
| 4,610,581 | 9/1986 | Heinlein | 409/132 |
| 4,721,421 | 1/1988 | Klinger | 407/63 |
| 4,963,059 | 10/1990 | Hiyama | 407/60 |
| 5,049,009 | 9/1991 | Beck et al. | 407/54 |
| 5,193,944 | 3/1993 | Nishimura | 407/53 |
| 5,221,163 | 6/1993 | Nishimura | 407/53 |

*Primary Examiner*—Andrea L. Pitts
*Assistant Examiner*—Henry W. H. Tsai
*Attorney, Agent, or Firm*—Gifford, Krass, Groh, Sprinkle, Anderson & Citkowski, PC

[57] ABSTRACT

An end-mill tool has at least one low helix angle flute, or primary flute) and at least two low helix angle flutes, or secondary flutes. The primary and secondary flutes intersect to define a plurality of compound helical cutting surfaces. Each of the compound cutting surfaces includes a cutting edge having a leading portion formed adjacent one of the primary flutes and a trailing portion formed adjacent one of the secondary flutes.

15 Claims, 4 Drawing Sheets

END-MILL TOOL WITH HIGH AND LOW HELICAL FLUTES AND RELATED METHOD FOR ROUGH CUTTING AND FINISHING A WORKPIECE

CROSS-REFERENCE TO RELATED APPLICATION

This is a continuation-in-part application of U.S. Ser. No. 08/238,864 filed May 6, 1994, now abandoned.

BACKGROUND OF THE INVENTION

1. Technical Field of the Invention

In general, the present invention relates to machining of a workpiece. More particularly, the present invention relates to end-mill tools for milling a workpiece and a related method.

2. Background of the Invention

Rotary cutting end-mill tools are used for various machining operations on workpieces. Such machine operations are generically referred to as milling operations and include the forming of slots, keyways, pockets, and the like. Several considerations related to end-mill tool design include time for completing a machining operation, amount of material removed in a cut, quality of the cut, and wear on the tool itself during the milling operation.

The various machining operations performed with an end-mill tool can be performed in a "roughing" mode (rough cutting) and a "finishing" mode (finishing cutting). During roughing, material is removed from a workpiece at a relatively high rate (e.g., depth of cut), but with a relatively rough surface finish. Finishing involves the removal of material from a workpiece at a relatively low rate, but with a relatively smooth surface finish. Generally, these two operations (roughing and finishing) are antithetical to one another, and require two operations with two different end-mills.

End-mill tools are formed from materials such as tungsten carbide, high speed steel, ceramic, and other advanced materials and coatings and typically include a "shank" portion, a "body" portion and a "point". The shank portion is located towards one end of the end-mill tool and is generally cylindrical (but may be tapered) for engagement by a spindle of a milling machine. In use, the milling machine rotatably drives the end-mill tool about its longitudinal axis. The body portion of the end-mill tool is located between the shank and the point. The point is formed at an opposite end of the tool from the shank portion, and typically includes one or more cutting edges.

To manufacture an end-mill tool, a grinder is typically used to grind a flute face and a corresponding cutting edge on the body of the end-mill tool. The grind (grinding operation) typically starts from a position adjacent an end of the body portion and continues to a point at or near the interface of the body portion and the shank portion, commonly referred to as an "inception location". The grind forms a desired helical flute face and/or helical cutting edge. Prior art end-mills typically have continuous helical flutes with continuous cutting edges helically extending from the inception location to the point (or vice-versa). The flutes function primarily for chip removal, in a manner similar to the helical flutes found on an ordinary drill bit.

An end-mill tool representative of the end-mill tools of the prior art is illustrated in FIGS. 1A and 1B and identified with reference numeral 100. The tool 100 has been formed of cylindrical rod stock which has been ground to form distinctive portions. At one end of the tool 100 is a shank portion 102, suitable for chucking to the spindle of a milling machine (not shown) for rotating and advancing the tool 100. At an other end of the tool 100 is a point 104 which is provided with flat cutting edges 114 and 116. Between the shank portion 102 and the point 104 is a body portion 106 which is helically ground to have a number of flutes 110 and 112. A "boundary" between the body portion 106 and the shank portion 102 is designated 108 in the drawing.

In the embodiment illustrated, the formation of flutes in the body portion 106 generally involves the grinding of two channels, or flutes 110 and 112, which form two diametrically-opposed positions at the point 104 towards the shank portion 102. The grinding is discontinued at the boundary 108 of the body portion 106 and the shank portion 102. It will be appreciated that the direction of the grind could, of course, be reversed. In a known variation referred to as a three-flute end-mill, three flutes wind helically around the body portion of the tool and terminating in three cutting edges. The flutes 110 and 112 are formed at a helix angle which "winds" around the cylindrical body portion.

Generally, the location of the flat cutting edges 114 and 116 is determined by the location of the flutes 110 and 112 at the point 104 of the tool 100. The end-mill tool 100 illustrated in FIG. 1A has two cutting edges 114 and 116 at the point 104. The number and location of the cutting edges 114 and 116 is determined by the flutes 110 and 112. FIG. 1B shows the cutting edges 114 and 116 of the tool 100 in greater detail.

It is known in the art to form flutes at a low helix angle or a high helix angle. A "low helix" (or low helical flute) is a flute that helically "winds" around a cylinder at an angle of no more than 45° (forty-five degrees). A "super" low-helical flute would be a flute that winds around a cylinder at an angle of at no more than 15°. A "high helix" (or high helical flute) is a flute that helically winds around a cylinder at an angle of greater than 45°. A "super" high-helical flute would be a flute that winds around a cylinder at an angle of at least 65°. Low helix angle flutes are typically employed for rough cutting while high helix angle flutes are employed for finish cutting.

Returning to FIG. 1A, the tool 100 is illustrated to include two cutting edges 120 and 122. Each of the cutting edges 120 and 122 is helical and follows one of the flutes 110 and 112 helically around the body portion 106. A notable feature of these cutting edges 120 and 122 is that they are "continuous"—in other words they helically extend continuously from the point 104 to the shank 102. These cutting edges 120 and 122 function to remove material in the linear direction of travel of the end-mill 100 (e.g., from right-to-left, as viewed in FIG. 1A) during a machining operation when the end-mill is "buried" into a workpiece. Material removed from the workpiece will tend to be in the form of an elongated helical (curlicue) chip, and will be guided away from the workpiece by the channels formed by the flutes 110 and 112.

By way of further definition, the edges 114 and 116 at the point 104 of the tool 100 can be considered to be "flat" cutting edges, and the cutting edges 120 and 122 along the body 106 of the tool 100 can be considered to be "helical" cutting edges.

The following U.S. Patents are further instructive of the prior art: U.S. Pat. Nos. 4,610,581; 5,049,009; 4,721,421; and 4,963,059. These patents are incorporated by reference as if fully set forth herein.

Numerous variations of the grind (e.g., flute angle) have been attempted for end-mill tool design. Prior advancements relating to material removal and feed rate of end-mill cutters have been accomplished by (1) varying the spiral lead angle; (2) increasing the depth of the flutes in the body portion of the end-mill, (3) changing the radial rake; (4) changing the clearance angles of the cutting edges; and (5) forming chip splitting grooves in the flutes.

While such variations have proven successful in various applications, they are also associated with disadvantages and limitations. For example, such variations may weaken the core diameter of the end-mill cutter, thereby weakening the tool. Additionally, such noted variations are not suitable for a particular applications (e.g., regarding milling time, rough cut, finish cut, etc.). Furthermore, known end-mills are not efficient for both rough cutting and finish cutting.

It is often advantageous when performing an end-mill machining operation to create many small chips, rather than fewer elongated curlicue chips. This allows, for example, rapid rate of removal of material from a workpiece without undue heating of the end-mill tool. Heat is generally anathema to tools, particularly end-mill tools. To the end of reducing heat, it is known to use coolants. Dry machining (sans coolant) offers an advantage of simplicity. Generally, the end-mill of the present invention provides for increased rate of removal without sacrificing tool life and strength, and may not require flowing coolant onto the workpiece or tool.

SUMMARY OF THE INVENTION

It is therefore a principal object of the present invention to provide an improved end-mill tool which overcomes the disadvantages and limitations of known constructions, including but not limited to those discussed above.

It is a related object of the present invention to provide an end-mill tool suitable for both roughing and finishing a workpiece.

It is another object of the present invention to provide an end-mill tool which provides for a higher rate of chip removal.

It is a more specific object of the present invention to provide an end-mill tool which includes a low helix flute and a high helix flute which intersect to define a plurality of compound helical cutting surfaces.

Generally according to the present invention, these above noted and other objects are achieved by having two distinct sets of flutes, a low-helix angle set of primary flutes and a high-helix angle set of secondary flutes intersecting the primary flutes. At points of intersection, compound helical cutting surfaces are defined which facilitate chip removal from a workpiece, thereby allowing for a high rate of chip removal.

In one preferred form, the present invention provides an end-mill tool which includes a shank, a point, and a main body portion located intermediate the shank and the point. A primary flute is formed on the main body portion along a first helix. A secondary flute is formed on the main body portion along a second helix. The primary and secondary flutes intersect one another. A compound helical cutting surface is defined by the primary flute and the secondary flute. The compound helical cutting surface includes a continuous cutting edge having a leading portion formed adjacent a portion of the primary flute and a trailing portion formed adjacent a portion of the secondary flute.

In a more preferred form, the present invention provides a combined roughing and finishing end-mill tool for forming a workpiece by removing chips from the workpiece. The end-mill tool includes a shank for engaging the end-mill tool to a rotating device and a point for plunging the tool into the workpiece. The end-mill tool further includes a main body portion located intermediate the shank and the point. A primary flute is formed on the main body portion along a first helix angle. At least two secondary flutes are formed on the main body portion along a second helix angle. The at least two secondary flutes intersect the primary flute. The primary flute and two secondary flutes cooperate to define a plurality of compound helical cutting surfaces. Each of the compound helical cutting surfaces includes a continuous cutting edge which is operative to remove chips from the workpiece of varying lengths such that chips having a first length are removed from the workpiece through the primary flute and chips having a second length are removed from the workpiece through the secondary flutes.

In another form, the present invention relates to a method for rough cutting and finishing a workpiece. The method comprises the step of providing an end-mill tool having a longitudinal axis, a primary flute disposed at a low helix angle, and a secondary flute disposed at a high helix angle. The primary and secondary flutes define a compound helical cutting surface having a continuous edge. The continuous cutting edge has a leading portion adjacent the primary flute with a first axial length and a trailing portion adjacent said secondary flute with a second axial length.

BRIEF DESCRIPTION OF THE DRAWINGS

Further objects, features and advantages of the present invention will become apparent from analysis of the following written specification and accompanying drawings and the appended claims in which:

DETAILED DESCRIPTION OF THE PRESENT INVENTION

Figure 1A:
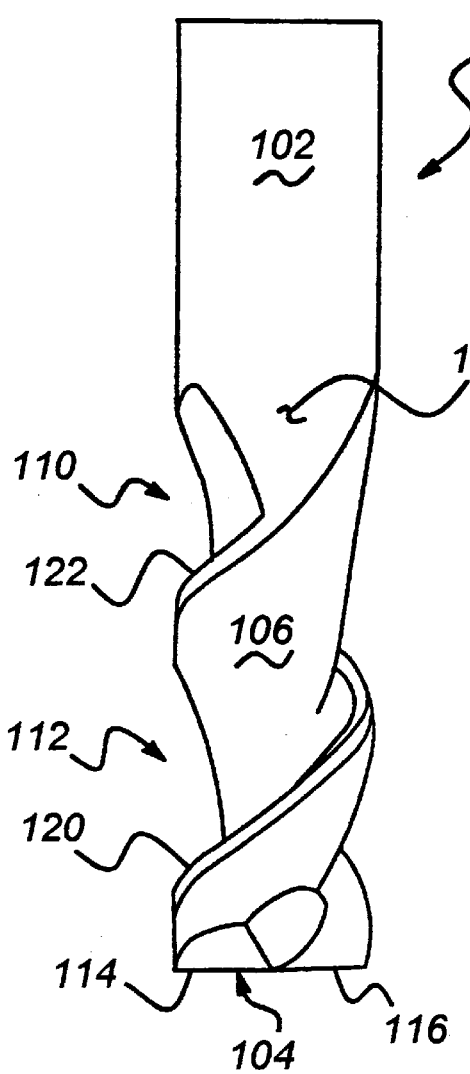
FIG. 1A is a side view of an end-mill tool, representative of the prior art.

The present invention will now be described more fully hereinafter with reference to the accompanying drawings in which preferred embodiments are shown. It will be appreciated, however, that the present invention may be embodied in many other forms and should not be construed as limited to the embodiments set forth herein. For purposes of clarity, the same reference numerals are used throughout the drawings to consistently identify identical or equivalent element. In the discussion that follows, it will be understood that no priority of function is meant to be attributed to the terms "primary" and "secondary". In this regard, these terms are used for identification purposes only.

First Preferred Embodiment of the Present Invention

Figure 2:
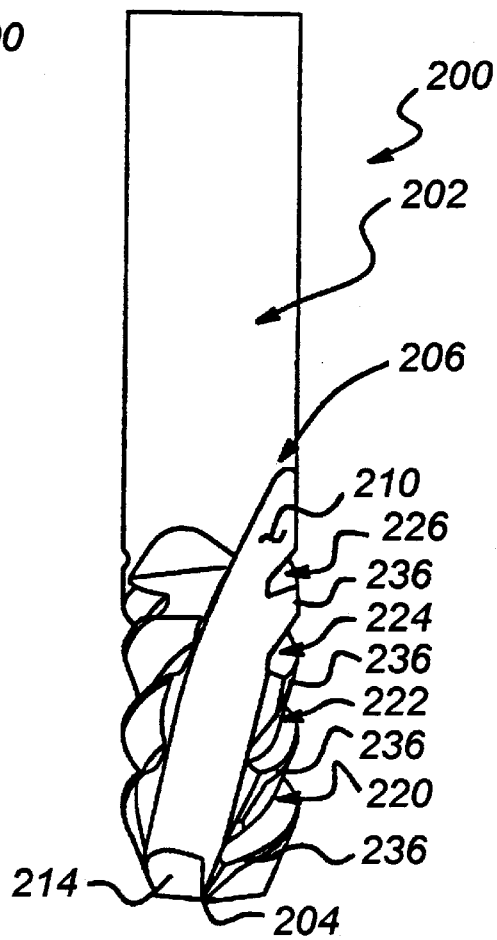
FIG. 2 is a side view of an end-mill constructed in accordance with a first preferred embodiment of the present invention, detailing the helical flute face of the end-mill.
Figure 1B:
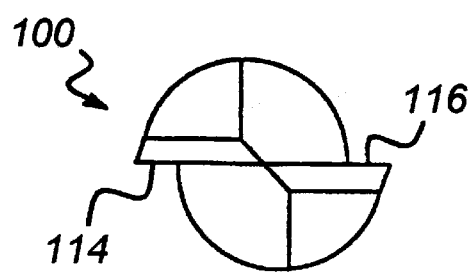
FIG. 1B is an end view of the end-mill tool of FIG. 1A.
Figure 3:
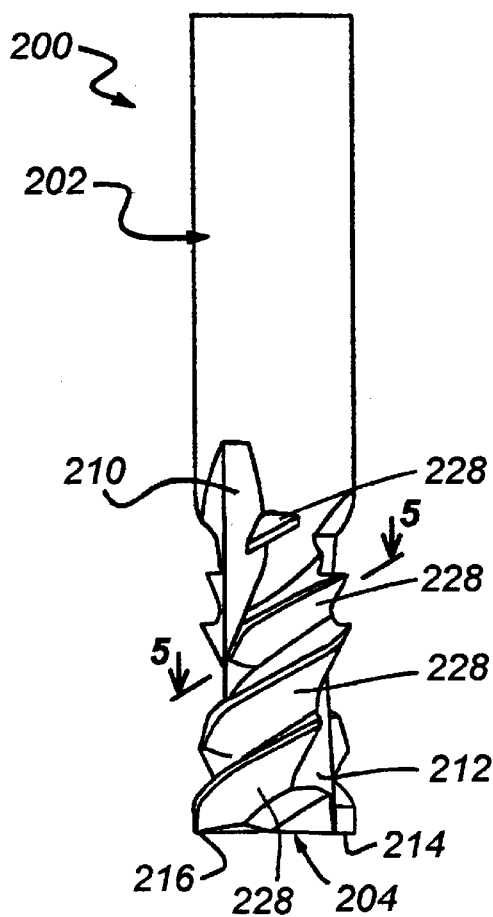
FIG. 3 is a side view of the end-mill of the first preferred embodiment of the present invention, from a different perspective than the view of FIG. 2, detailing the helical cutting edge of the end-mill.
Figure 5A:
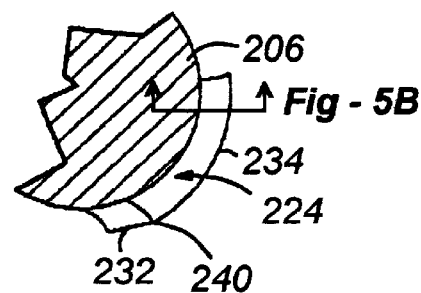
FIG. 5A is a partial plan view taken in the direction 5—5 of FIG. 2.
Figure 6:
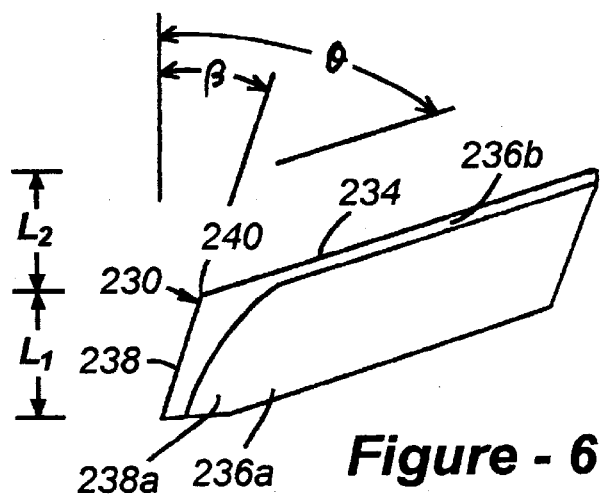
FIG. 6 is an enlarged side view of a portion of the end-mill of FIG. 2.
Figure 4:
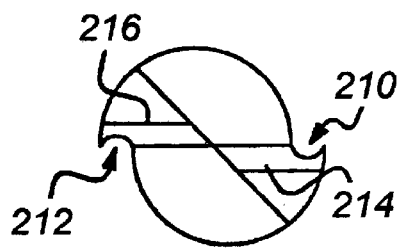
FIG. 4 is an end view of the end-mill of FIG. 2.
Figure 7:
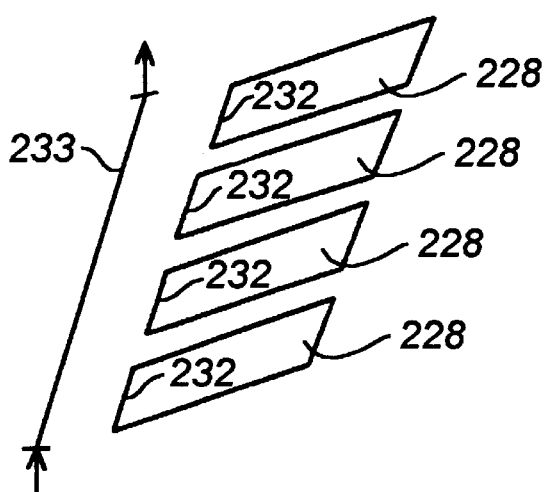
FIG. 7 is an enlarged simplified view of four vertically adjacent lands of the end-mill of the first preferred embodiment.
Figure 5B:
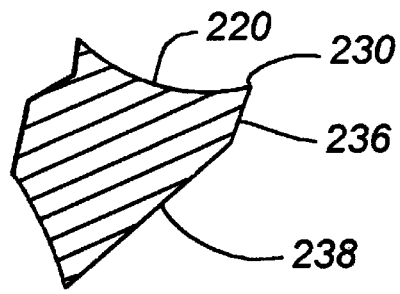
FIG. 5B is a cross-sectional view taken along the time 5B—5B of FIG. 5A.

Referring generally to FIGS. 2 through 7 of the drawings, an end-mill tool constructed in accordance with the first preferred embodiment is identified with reference numeral 200. FIGS. 2 and 3 illustrate two side views of the end-mill 200 of the present invention, taken ninety (circumferential) degrees from one another. FIG. 4 is an end view of the end-mill of FIGS. 2 and 3. FIGS. 5, 6 and 7 further show details of the end-mill 200. As will become evident, this embodiment is termed a "2×4" embodiment, since it has two primary flutes and four secondary flutes.

The end-mill tool 200 is shown to generally include a shank portion 202, a point 204 and a body portion 206. The end-mill has two primary flutes 210 and 212 extending from the point towards the shank portion 202. Only one of the flutes 210 is visible in the view of FIG. 2.

The primary flutes 210 and 212 are formed at a relatively shallow helix angle $\beta$. In the embodiment illustrated, the helix angle $\beta$ is preferably approximately 15°, which, according to the definitions set forth above is a super low-helix angle. At the point 204 of the tool 200, the two primary flutes 210 and 212 terminate and define a pair of flat cutting edges 214 and 216, commonly referred to as end teeth cutting edges.

Further, in the embodiment illustrated, the end-mill has four secondary flutes 220, 222, 224 and 226 which helically wind around the body portion 206 at a helix angle $\Theta$ which is different than the helix angle $\beta$. It will be appreciated by those skilled in the art that the specific number of secondary flutes 220–226 is largely a matter of design choice and subject to variation. The four secondary flutes 220–226 originate from four evenly-spaced virtual points (not shown) around the circumference of the point 204, and terminate at four evenly-spaced virtual points (not specifically shown) around the circumference of the body portion 206 (e.g., at the intersection of the body portion and the shank portion 202). Preferably, the secondary flutes 220–226 are all formed along the same helix angle $\Theta$. However, the secondary flutes 220–226 can alternatively be formed at different angles relative to one another.

The two primary flutes 210 and 212 and the four secondary flutes 220–226 intersect and cooperatively define a plurality of compound helical cutting surfaces or lands 228. A side view of one of the lands 228 is shown in FIG. 6. The simplified side view of FIG. 7 illustrates the relative orientation of four axially adjacent lands 228. For purposes of illustration, each of the lands 228 is shown to be equal in size and shape. As shown particularly in FIG. 2, depending on its location, a particular land 228 (e.g. the uppermost land 228) may only be partially formed. The lands 228 illustrated in FIG. 7 are generally disposed radially between the first and second primary flutes 210 and 212. It will be understood that a corresponding number of lands 228, which are substantially identical in shape and form, are formed on a circumferentially opposing side of the tool 200.

The secondary flutes 220–226 are formed in the body portion 206 of the tool 200 at a relatively high helix angle $\Theta$. Preferably the helix angle $\Theta$ of the secondary flutes 220–226 is approximately 65°, which, according to the definitions set forth above is a super high-helix angle. The secondary flutes 220–226 preferably intersect the primary flutes 210 and 212 at an angle of at least 45°. In the exemplary embodiment illustrated, the primary flutes 210 and 212 intersect the secondary flutes 220–226 at an angle of approximately 50° (i.e. the difference between the high helix angle $\Theta$ (65°) and the low helix angle $\beta$ (15°)).

With specific reference to FIG. 6, each of the compound helical cutting surfaces 228 is formed to include a continuous cutting edge 230. These cutting edges 230 each includes a leading portion 232 and a trailing portion 234. The leading portions 232 are disposed at the intersection of the secondary flutes 220–226 and the primary flute 210, and are disposed at the low-helix angle $\beta$ (e.g., 15°) which is determined by the helix angle $\beta$ of the primary flutes 210. Inasmuch as the angle of the leading portions 232 of the cutting edges 230 is determined by the primary flute 210, they are considered to be "low-helical" cutting edges. As shown in the simplified view of FIG. 7, the leading portions 232 of the cutting edges 230 are aligned along a straight line 233.

Each trailing portion 234 of the cutting edges 230 originates from the top of a respective leading portion 232 and helically winds around a portion of the body portion 206. These trailing portions 234 are located at the interface of the compound surface 228 and a respective secondary flute 220–226, and are disposed at the high-helix angle $\Theta$ (e.g., 65°) which is determined by the helix angle $\Theta$ of the secondary flutes 220–226. Inasmuch as the angle of the trailing portions 234 is determined by the secondary flutes 220–226, they are considered to be "high-helical" cutting edges.

With continued reference to FIG. 6, adjacent pairs of leading portions 232 and trailing portions 234 are provided with a common cutting relief 236 and a common clearance relief 238 behind the cutting relief 236. The cutting relief 236 includes a leading portion 236a adjacent the leading portion 232 and a trailing portion 236b adjacent the trailing portion 234 of the cutting edge 234. Similarly, the clearance relief 238 includes a leading portion 238a adjacent the leading portion of the cutting relief 236 and a trailing portion 238b adjacent the trailing portion 236b of the cutting relief 236. The cutting relief 236 allows for radial clearance during milling operation.

An important feature of the present invention is that the leading portion 236a of the cutting relief 236 "runs into" (intersects, and is continuous with) the trailing portion 236b of the cutting relief 236. Likewise, the leading portion 238a and trailing portions 238b of the clearance relief 238 run into one another.

In the embodiment illustrated, the trailing portions 234 of the cutting edges 230 have an axial dimension (as measured along the longitudinal axis of the tool 200), from a one edge to the next, of a dimension $L_2$. The axial (vis-a-vis the longitudinal axis of the tool 200) extent of each of the leading portions 232 is each of a dimension $L_1$. These dimensions $L_1$ and $L_2$ are of particular interest and are discussed in greater detail hereinbelow.

As mentioned above, the helix angle β of the primary flutes 210 and 212 is preferably low, on the order of 15°, and the helix angle Θ of the secondary flutes is preferably high, on the order of 65°. An important feature of the invention is that the leading portion 232 and associated (e.g., on the same flute surface) trailing portion 234 form a contiguous cutting edge 230 of dimension $L_1+L_2$ for improved chip removal.

Provided that the rotational speed of the tool 200 is sufficient, the chips removed from the workpiece by the leading and trailing portions 232 and 234 of the cutting edges 230 will correspond in length to their respective axial lengths $L_1$ or $L_2$. More particularly, a single chip is formed by the continuous cutting edge 230. Splitting of the chip will occur at an intersection 240, or corner, of the leading portion 232 and the trailing portion 234. Chips cut from the trailing portion 234 will "flow" through the respective adjacent secondary flute (e.g., 220–226). Chips cut from the leading portion 232 will flow through the associated low helical flute (e.g., 210 or 212).

In certain applications, the leading and trailing portions 232 and 234 will remove one chip (without chip splitting) having a length corresponding to the sum of their axial dimensions ($L_1+L_2$). For example, if the rotational speed of the tool 200 is not sufficient, the splitting of the chips at the intersection 240 may not occur. The required rotational speed depends primarily upon the material of the workpiece and the amount of material being removed from the workpiece. Therefore, it may be desirable to incorporate additional chip splitting (breaking) structures (not shown, such as grooves) on the trailing portions 234 for machining under such circumstances. Such structures include grooves (not shown) and the like, and are well known in the art.

The present invention contemplates a range of helix angles for the primary flutes 210 and 212 and for the secondary flutes 220–226 in addition to the low and high helix angles β and Θ set forth hereinabove. Evidently, it is important that the primary and secondary sets of flutes intersect one another. The present invention further contemplates:

primary flute helix angles β of at least 0°, but preferably no more than 45°, although primary flutes having helix angles greater than 45° are possible; and secondary flute helix angles Θ of no more than 65°, although secondary flutes having helix angles greater than 65° is possible.

It is also within the scope of the present invention that the primary flutes 210 and 212 are angled in a different direction relative to the secondary flutes 220–226 in which case, for example, the two helix angles β and Θ could be equal in magnitude but different in direction. For example, a set of primary flutes 210 and 212 may have a left-hand helix angle of 30°, and a set of secondary flutes 220–226 may have a right-hand helix angle of 30°. These angles, although equal in magnitude, are different (in direction) than one another, which will cause the primary flutes 210 and 212 and the secondary flutes 220–226 to intersect one another on the body portion 206 of the tool 200.

The helix angles can be modified over a wide range. For example, specific applications may include, but by no means are limited to, the following:

primary flutes 210 and 212 at 15°, secondary flutes 220–226 at 65°;

primary flutes 210 and 212 at 30°, secondary flutes 220–226 at 60°; and primary flutes 210 and 212 at 50°, secondary flutes 220–226 at 80°.

The method of forming the tool 200 of the present invention generally includes the following steps:

1. providing a generally cylindrical tool blank (not shown);
2. grinding the primary flute 210 at the low helix angle β into the body portion 206;
3. grinding the second primary flute 212 at the low helix angle β into the body portion 206;
4. grinding the first secondary flute 220 at the high helix angle Θ into the body portion 206;
5. grinding the second secondary flute 222 at the high helix angle Θ into the body portion 206;
6. grinding the third secondary flute 224 at the high helix angle Θ into the body portion 206;
7. grinding the fourth secondary flute 226 at the high helix angle Θ into the body portion 206;
8. grinding continuous cutting reliefs 236 on each of the compound helical cutting surfaces 228 by following the low helix angle β until the intersection point 240 and following the high helix angle Θ thereafter;
9. grinding continuous clearance reliefs 238 on each of the compound helical cutting surfaces 228 by following the low helix angle β until the intersection point 240 and following the high helix angle Θ thereafter;
10. grinding reliefs and clearances at the point 204 to form the cutting edges 214–216.

Figure 8:
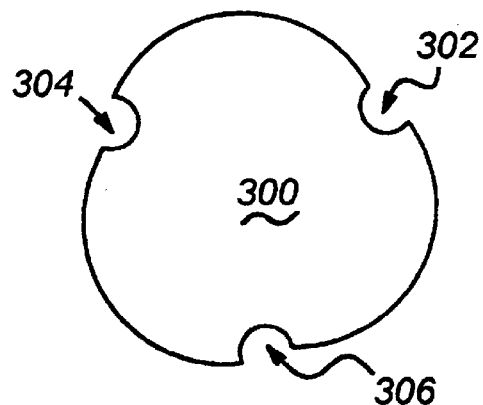
FIGS. 8 and 9 are simplified end views, illustrating alternate constructions of the first preferred embodiment of the end-mill of the present invention.
Figure 9:
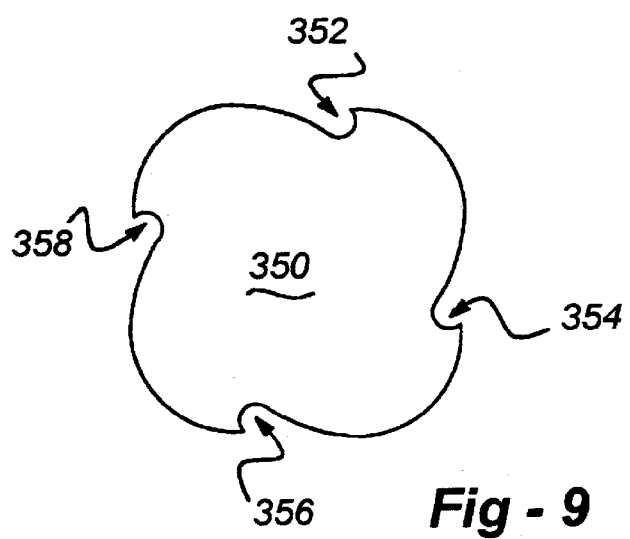

Alternative constructions to the first preferred embodiment of the end-mill 200 of the present invention are provided in the simplified end views of FIGS. 8 and 9. For example, FIG. 8 illustrates a simplified end view of an embodiment of an end-mill 300 having three primary flutes 302, 304, and 306 which are visible in an end view looking onto the point of the end-mill 300. With three secondary flutes (not shown), this would be termed a "3×3" end-mill. FIG. 9 illustrates an embodiment of an end-mill 350, the invention having four primary flutes 352, 354, 356, and 358 which are visible in an end view looking onto the point of the end-mill. With four secondary flutes (not shown), this would be termed a "4×4" end-mill.

Various embodiments of an end-mill may be fabricated according to the techniques set forth hereinabove by varying parameters such as helix angles β and Θ, spacing of a plurality of discrete low-helical leading portions 232, and the like. Further alternative embodiments from the previously-described embodiments principally in the number of primary and secondary flutes formed. Generally, since each one-or-more ("N") primary flute is typically intersected at least once by each one-or-more ("M") secondary flute, various end-mills can be fabricated having "N×M" configurations. It will be readily appreciated that the present invention is not limited to any particular number of flutes or discrete low-helix angle cutting edges.

Second Preferred Embodiment of the Present Invention

Figure 12:
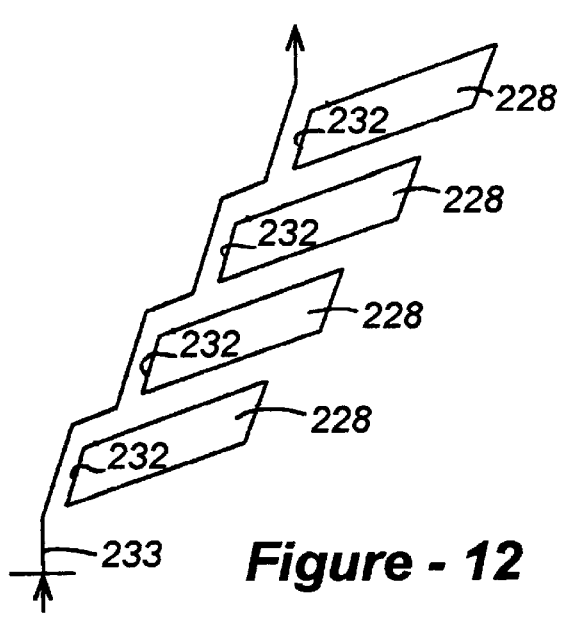
FIG. 12 is an enlarged simplified view similar to FIG. 7, illustrating four vertically adjacent lands of the second preferred embodiment and showing the right stagger of the lands.
Figure 10:
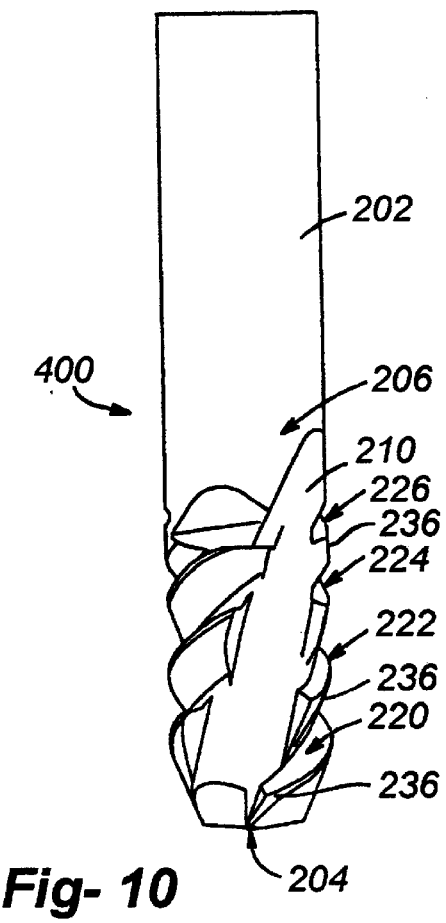
FIG. 10 is a side view of an end-mill constructed in accordance with a second preferred embodiment of the present invention, detailing the helical flute face of the end-mill.
Figure 11:
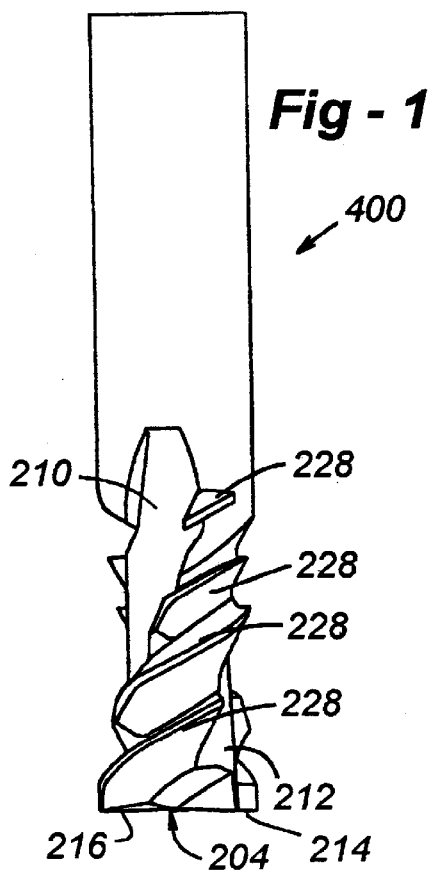
FIG. 11 is a side view of the end-mill of the second preferred embodiment of the present invention, from a different perspective than the view of FIG. 10, detailing the helical cutting edge of the end-mill.

With reference now to FIGS. 10 through 12, an end-mill tool 400 constructed in accordance with a second preferred embodiment of the present invention is illustrated. The reference numerals used for the first preferred embodiment have been applied to drawings for the second preferred embodiment to identify identical or equivalent elements.

The first and second preferred embodiments differ only in that the leading portions 232 of the cutting edges 230 of the second preferred embodiment are staggered to the right progressing from the point 204 to the shank 202 (e.g., a staggered right hand spiral). This is specifically shown in FIG. 12 by the right stagger of the line 233. By incorporating a stagger for certain applications, the leading portions 232 of the cutting edges 230 engage the workpiece at different times, thereby reducing the cutting forces for milling a workpiece and also reducing the required energy, such as spindle horsepower. In some applications, such an arrangement may further facilitate chip removal.

Figure 13:
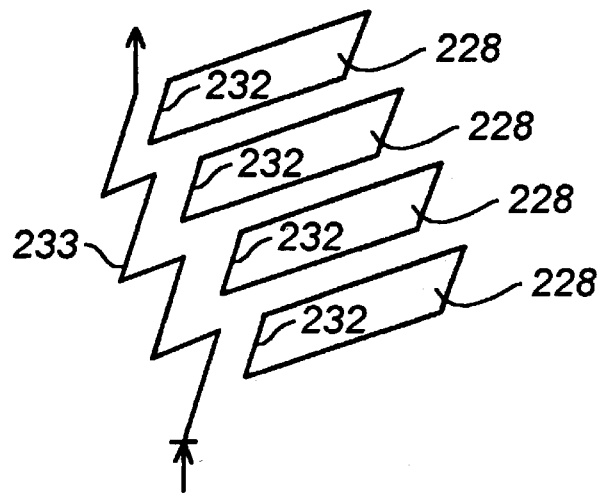
FIG. 13 is another enlarged simplified view similar to FIG. 7, illustrating an alternative arrangement to the second preferred embodiment having a left stagger of adjacent lands.

Turning now to FIG. 13, a simplified side view of the adjacent lands 228 similar to FIG. 12 illustrating an alternative construction of the second preferred embodiment of the present invention is shown. In this alternative construction, the cutting edges 232 are staggered to the left progressing from the point 204 to the shaft 202 (e.g., a staggered left hand spiral).

The specific method of the present invention contemplates use of one of the above-described embodiments or alternatives thereto and includes the step of rotating the end-mill tool (e.g., 200) about its longitudinally axis. The method further includes the steps of removing a first plurality of chips from the workpiece through the primary flute and removing a second plurality of chips from the workpiece through the secondary flutes. In the preferred method, the chips of the first plurality of chips each have a length which is substantially equivalent to the axial length $L_1$ of the leading portion 232 and the chips of the second plurality of chips each are substantially equivalent in length to the axial length $L_2$ of the trailing portion 234 of the cutting edge 230.

The preferred embodiments and alternatives discussed above all assume that the primary and secondary flutes each are formed along right hand helix. In certain applications, it may be desired to incorporate a left hand helix. For example, such an orientation may be desired where downward transfer of removed chips is preferred.

The above, and other objects, features, advantages and embodiments of the invention, including other embodiments of the techniques discussed above may become apparent to one having ordinary skill in the art to which this invention most nearly pertains, and such other and additional embodiments are deemed to be within the spirit and scope of the present invention. For example, the compound helical cutting surfaces which are described as being integrally formed with the tool may alternatively be provided on removable inserts. In certain applications, carbide inserts may be braised to a steel body or alternatively mounted to the steel body with suitable fasteners.

What is claimed is:

1. An end-mill for performing a machining operation on a workpiece, the end-mill comprising:
   a shank;
   a point;
   a main body portion located intermediate said shank and said point;
   at least one primary flute formed on said main body portion along a first helix angle; said at least one primary flute defining a primary helical cutting surface,
   at least one secondary flute formed on said main body portion along a second helix angle, said at least one secondary flute defining a secondary helical cutting surface, said primary and secondary flutes intersecting; and said corresponding primary and secondary helical cutting surfaces intersecting to form a compound helical cutting surface, said compound helical cutting surface including a continuous cutting edge having a leading cutting edge formed along a portion of said primary helical cutting surface and a trailing cutting edge formed along a portion of said secondary helical cutting surface.

2. The end-mill according to claim 1, wherein said at least one primary flute and said at least one secondary flute define a plurality of compound helical cutting surfaces.

3. The end-mill according to claim 2, said leading portions of said continuous cutting edges of said plurality of compound helical cutting edges are staggered from a common line.

4. The end-mill according to claim 1, further comprising a cutting relief including a leading portion formed adjacent said portion of said leading cutting edge and a trailing portion formed adjacent said portion of said trailing cutting edge, said leading portion and said trailing portion intersecting.

5. The end-mill according to claim 3, further comprising a clearance relief including a leading portion formed adjacent said leading portion of said cutting relief and a trailing portion formed adjacent trailing portion of said cutting relief.

6. The end-mill according to claim 1, wherein said second helix angle is greater than said first helix angle.

7. The end-mill according to claim 1, wherein the end-mill has at least two primary flutes and at least two secondary flutes.

8. The end-mill according to claim 1, wherein said secondary flute is disposed on the main body portion at a high-helix angle, and said at least one primary flute is disposed on the main body portion at a low-helix angle.

9. The end-mill according to claim 8, wherein said high-helix angle is at least 45° greater than the low-helix angle.

10. A combined roughing and finishing end-mill tool for forming a workpiece by removing chips from the workpiece, the end-mill tool comprising:
    a shank for engaging the end-mill tool with a rotating device for rotating the end-mill tool about a longitudinal axis;
    a point for plunging the tool into the workpiece;
    a main body portion located intermediate said shank and said point;
    at least one primary flute formed on said main body portion along a first helix; said at least one primary flute defining a primary helical cutting surface;
    a least one secondary flute formed on said main body portion along a second helix angle, said at least one secondary flute defining a secondary helical cutting surface, said at least one secondary flute intersecting said at least one primary flute; said primary and secondary helical cutting surfaces intersecting; and
    a plurality of compound helical cutting surfaces defined by said primary and secondary cutting surfaces, each of said compound helical cutting surfaces including a continuous cutting edge operative to remove chips of varying lengths from the work piece such that chips having a first length are removed from the workpiece through the at least one primary flute and chips having a second length are removed from the workpiece through the at least one secondary flute.

11. The combined roughing and finishing end-mill tool of claim 8, wherein said continuous cutting edge includes a leading portion formed adjacent said at least one primary flute and a trailing portion formed adjacent one of said secondary flutes.

12. The combined roughing and finishing end-mill tool of claim 9, wherein said leading portion of said continuous cutting edges has an axial dimension substantially equivalent to said first length.

13. The combined roughing and finishing end-mill tool of claim 10, wherein said trailing portion of said continuous cutting edges has an axial dimension substantially equivalent to said second length.

14. The combined roughing and finishing end-mill tool of claim 10, wherein said first helix angle is a low helix angle and said second helix angle is a high helix angle.

15. A method of rough cutting and finishing cutting a workpiece, the method comprising the steps of:

providing an end-mill tool having a longitudinal axis, a primary flute disposed at a low helix angle and a secondary flute disposed at a high helix angle, said primary and secondary flutes intersecting to form a compound helical cutting surface having a continuous cutting edge, said continuous cutting edge having a leading portion along said primary flute with a first axial length and a trailing portion along said secondary flute with a second axial length;

removing a first plurality of chips from the workpiece through said primary flute; and removing a second plurality of chips from the workpiece through said secondary flute.

* * * * *

UNITED STATES PATENT AND TRADEMARK OFFICE
CERTIFICATE OF CORRECTION

PATENT NO. : 6,007,276
DATED : December 28, 1999
INVENTOR(S) : Lon J. Wardell

It is certified that error appears in the above-identified patent and that said Letters Patent is hereby corrected as shown below:

<u>Column 2,</u>
Line 4, replace "an other" with -- another --.

<u>Column 3,</u>
Line 12, remove "a" before -- particular --

<u>Column 4,</u>
Line 46, replace "time" with -- line --.

<u>Column 9,</u>
Line 12, replace "some" with -- certain --.

<u>Column 11,</u>
Line 6, replace "edges" with -- edge --.
Line 10, replace "edges" with -- edge --.

Signed and Sealed this

Fifth Day of March, 2002

Attest:

JAMES E. ROGAN
*Attesting Officer*   *Director of the United States Patent and Trademark Office*